March 30, 1965 J. S. LINN 3,176,211
POLYPHASE POWER SOURCE
Filed March 28, 1960 6 Sheets-Sheet 1
Fig.1
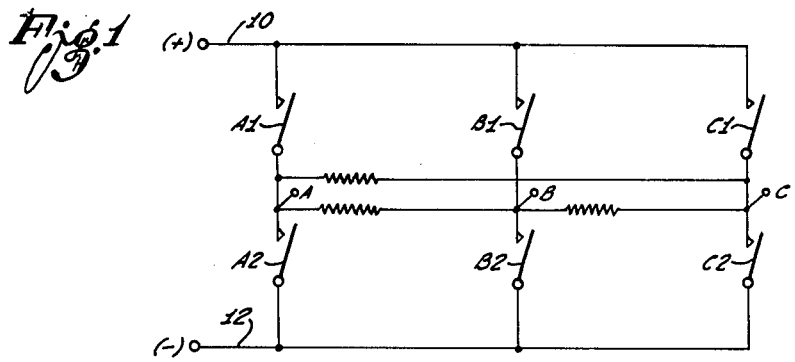
Fig.2
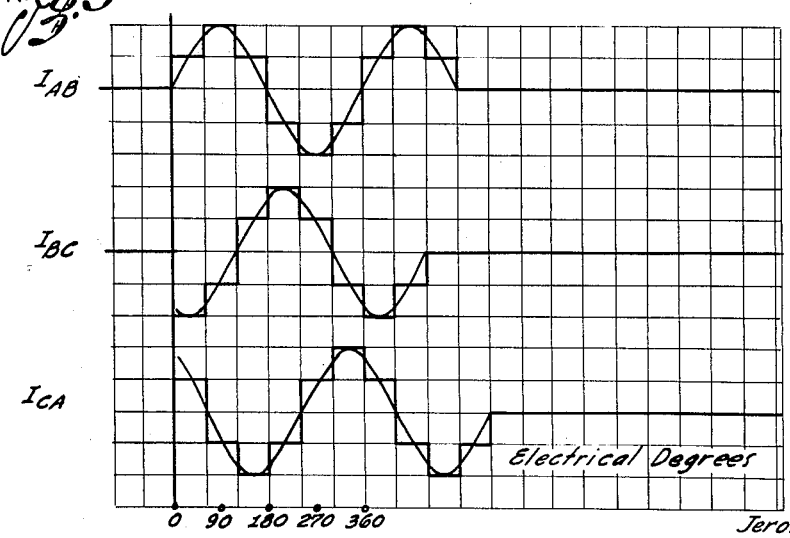
Fig.3
INVENTOR
Jerome S. Linn
Attorneys.

March 30, 1965

J. S. LINN 3,176,211

POLYPHASE POWER SOURCE

Filed March 28, 1960

INVENTOR:
Jerome S. Linn

By Smyth, Roston & Pavitt
Attorneys

March 30, 1965
J. S. LINN
3,176,211
POLYPHASE POWER SOURCE
Filed March 28, 1960
6 Sheets-Sheet 3
Fig.5
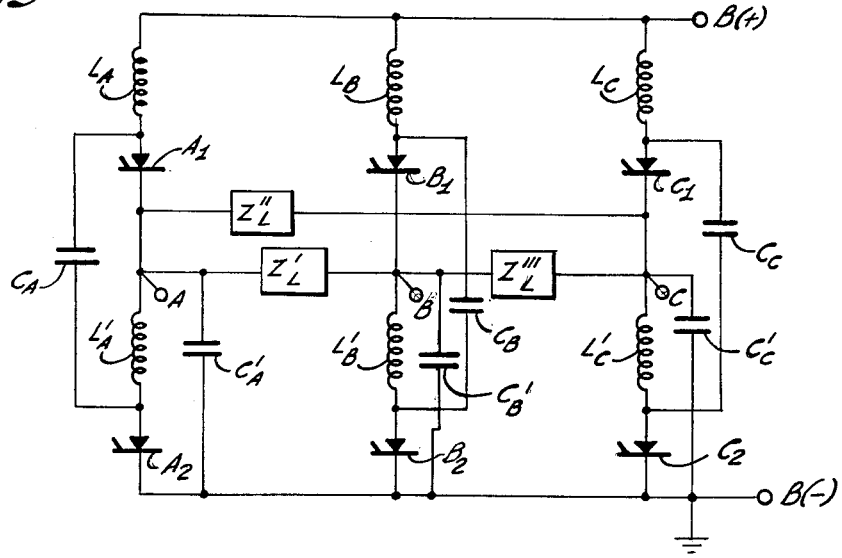
Fig.6 (Trigger Pulses)
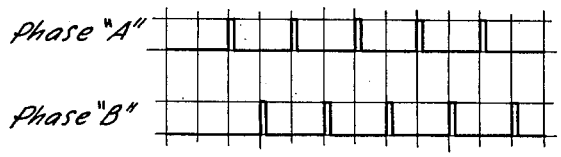
Fig.7 (Commutation Sequence)
| STEP | CONDUCTING | NON-CONDUCTING | VOLTAGE Terminals | | |
|---|---|---|---|---|---|
| | | | A | B | C |
| 1 | $A_1$ $B_2$ $C_2$ | $A_2$ $B_1$ $C_1$ | 1 | 0 | 0 |
| 2 | $A_1$ $B_1$ $C_2$ | $A_2$ $B_2$ $C_1$ | 1 | 1 | 0 |
| 3 | $A_2$ $B_1$ $C_2$ | $A_1$ $B_2$ $C_1$ | 0 | 1 | 0 |
| 4 | $A_2$ $B_1$ $C_1$ | $A_1$ $B_2$ $C_2$ | 0 | 1 | 1 |
| 5 | $A_2$ $B_2$ $C_1$ | $A_1$ $B_1$ $C_2$ | 0 | 0 | 1 |
| 6 | $A_1$ $B_2$ $C_1$ | $A_2$ $B_1$ $C_2$ | 1 | 0 | 1 |
INVENTOR:
Jerome S. Linn
Attorneys.

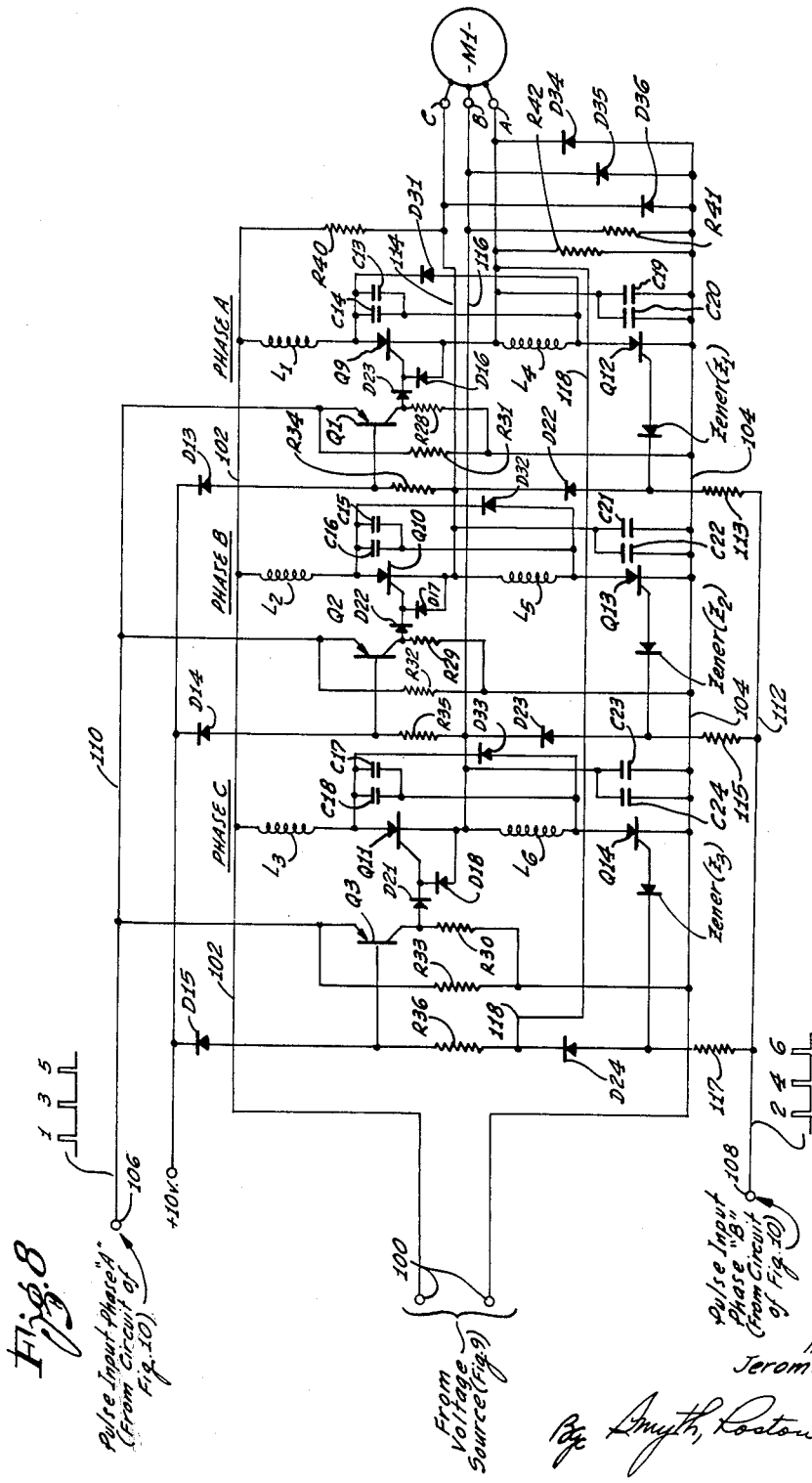

March 30, 1965 J. S. LINN 3,176,211
POLYPHASE POWER SOURCE
Filed March 28, 1960 6 Sheets-Sheet 5
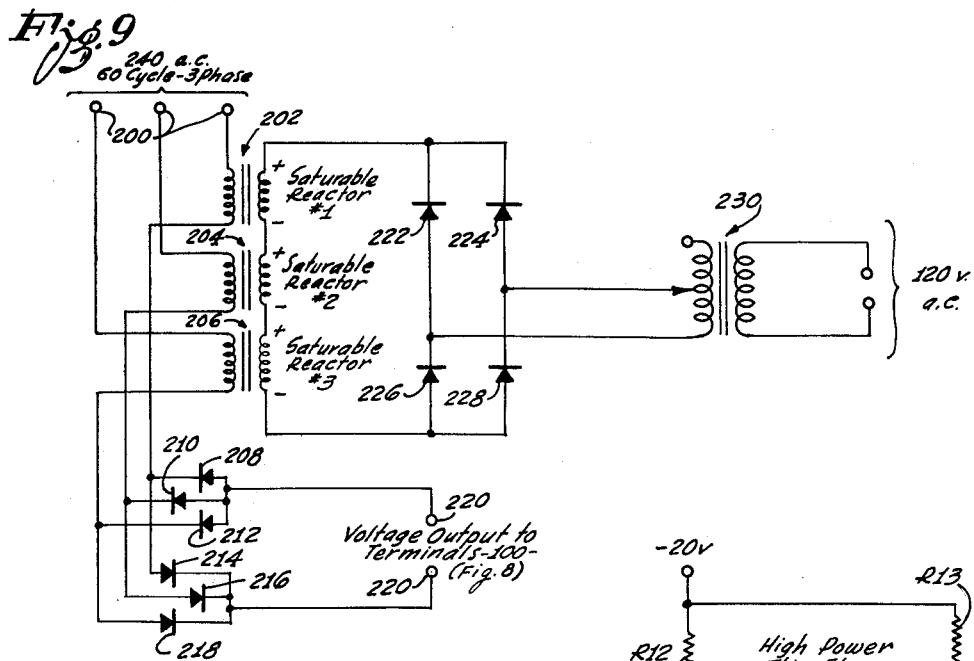
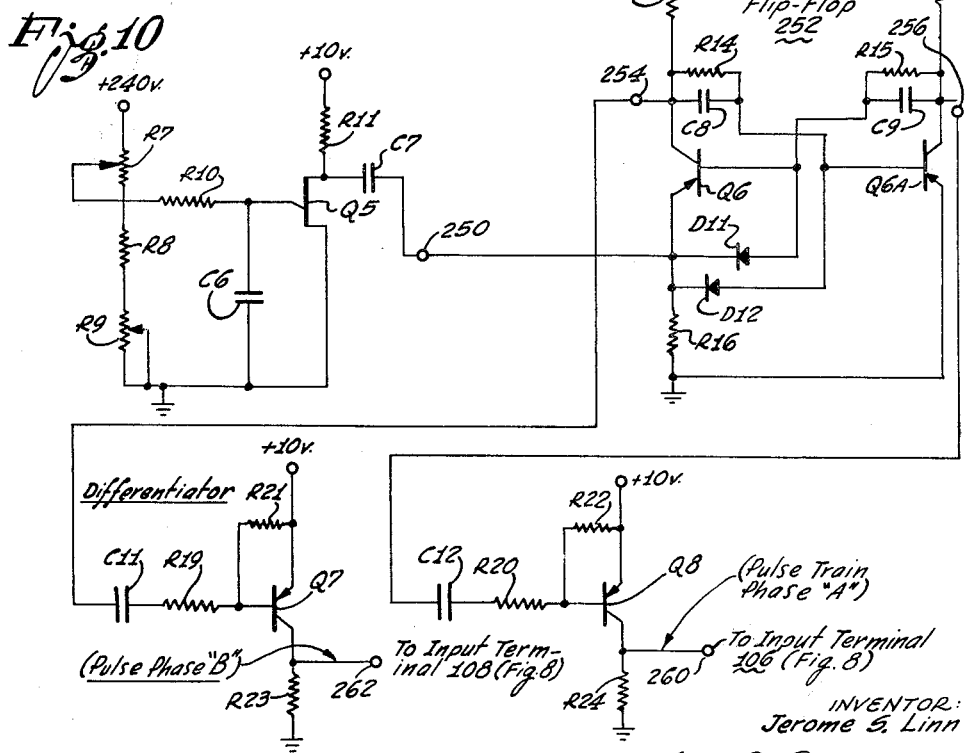
INVENTOR:
Jerome S. Linn
Attorneys.

March 30, 1965 J. S. LINN 3,176,211
POLYPHASE POWER SOURCE
Filed March 28, 1960 6 Sheets-Sheet 6

INVENTOR:
Jerome S. Linn
By Smyth, Roston & Pavitt
Attorneys.

United States Patent Office 3,176,211
Patented Mar. 30, 1965

3,176,211
POLYPHASE POWER SOURCE
Jerome S. Linn, Los Angeles, Calif., assignor to Genisco,
Inc., Los Angeles, Calif., a corporation of California
Filed Mar. 28, 1960, Ser. No. 18,016
9 Claims. (Cl. 321—5)

The present invention relates to a polyphase power source for supplying electric energy, and it relates more particularly to a variable frequency solid-state polyphase power source for driving an electric motor in precisely controlled variable speeds.

The system of the present invention is most advantageous in that it provides a constant-current source of power for a motor which is controllable in frequency throughout an extremely wide range and down to an extremely low frequency. This provides a corresponding wide range of speed controls for the motor driven by a power source constructed in accordance with the invention. A constructed embodiment of the invention, for example, exhibited a controllable frequency range of from 3 c.p.s. to 80 c.p.s. However, power sources constructed in accordance with the concepts of the present invention are capable of producing signal frequencies up to values of the order of 10 kilocycles.

A further feature and advantage of the system of the invention is that it is capable of precise servo or crystal control, or of remote control, for establishing the frequency of its generated power at a selected value, and the established frequency can be set and maintained precisely at the selected value. The current provided by the system is constant with variations of frequency so that the system has particular application for driving electric motors or other current responsive apparatus.

The power source of the invention is most efficient, efficiencies of the order of 95% being encountered in the constructed embodiment. Moreover, embodiments of the invention have been constructed which are capable of handling up to 4½ kilovolt amperes. In brief, the invention in one of its particular aspects provides an improved solid-state polyphase power source of relatively high power, and which is capable of providing a most accurate and precise variable speed power control for a synchronous, induction, or other type of alternating current motor.

The embodiment of the invention to be described uses solid-state switches which are generally referred to in the art as silicon controlled rectifiers. Such rectifiers are presently being manufactured by the General Electric Company, and are designated by General Electric as Type C35. The silicon controlled rectifier is a three-junction semi-conductor device, and it is esepcially adapted for use in power control and power switching applications which require voltages up to 400 volts and load currents up to 16 amperes.

Operation of the silicon controlled rectifier in a circuit may be compared to that of a Thyratron. The silicon controlled rectifier includes two electrodes which will be referred to as an anode and a cathode, and a third "gate" electron for firing the device and which is comparable to the control grid of the Thyratron. As with the Thyratron, conduction in the silicon controlled rectifier can be achieved by exceeding some critical anode-to-cathode voltage, or by applying a signal to the control grid, or "gate" in the presence of a positive anode voltage above a particular threshold. In a Thyratron, the firing signal is generally applied as positive grid-to-cathode voltage. In the silicon controlled rectifier, it is positive gate-to-cathode current since the firing of the rectifier is dependent upon current rather than voltage.

In the particular embodiment to be described, a plurality of silicon controlled rectifiers are connected into a switching circuit in the form of two ring counters of three steps each. The switching circuit controls the current from a constant current source. The resulting output signals from the switching circuit take the form of three signals mutually displaced in phase by 120 degrees. These signals, as will be described, each swing positively and negatively with respect to a reference voltage, and they have a stepped waveform which approximates the sinusoidal. These signals are used, for example to constitute three phase driving power for a three phase synchronous or induction motor.

A precisely controlled variable frequency source is coupled to the switching circuit referred to in the preceding paragraph. This source introduces two opposite-phased trains of trigger pulses to the switching circuit to cause it to step from one configuration to the next, in a manner and by a gating system to be described, so as to generate the polyphase output power.

In the drawings:

FIGURE 1 is a schematic diagram of a switching circuit which is useful in explaining the operation of the system of the invention;

FIGURE 2 is a table illustrating the sequence of switch openings and closures in the circuit of FIGURE 1 which are followed to produce a desired plurality of output signals of a desired configuration;

FIGURE 3 is a series of curves illustrating the waveform which the output signals derived from the circuit of FIGURE 1 may assume;

Figure 4:
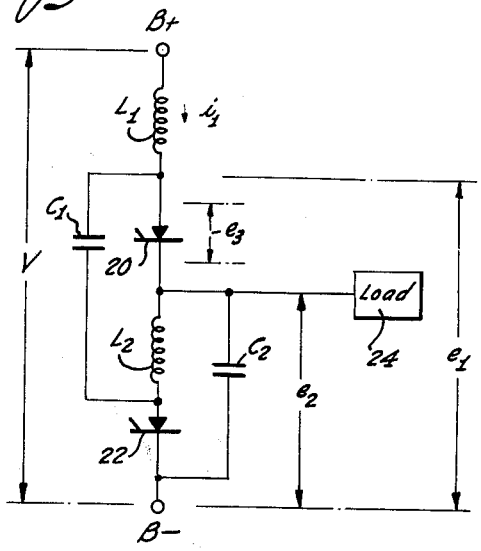
Figure 4A:
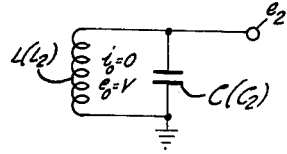
Figure 4B:
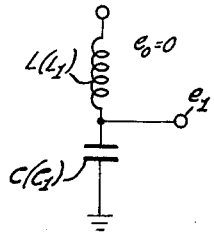
Figure 4C:
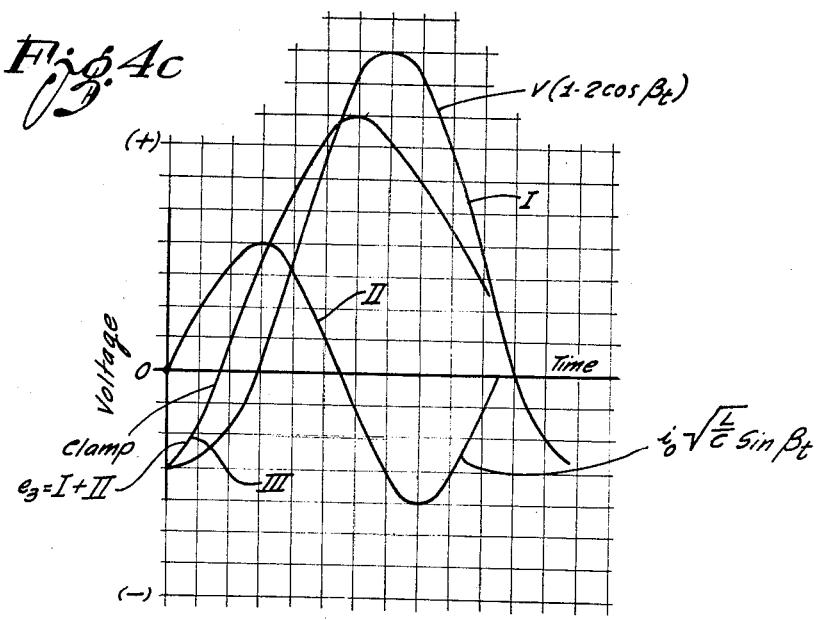
Figure 11:
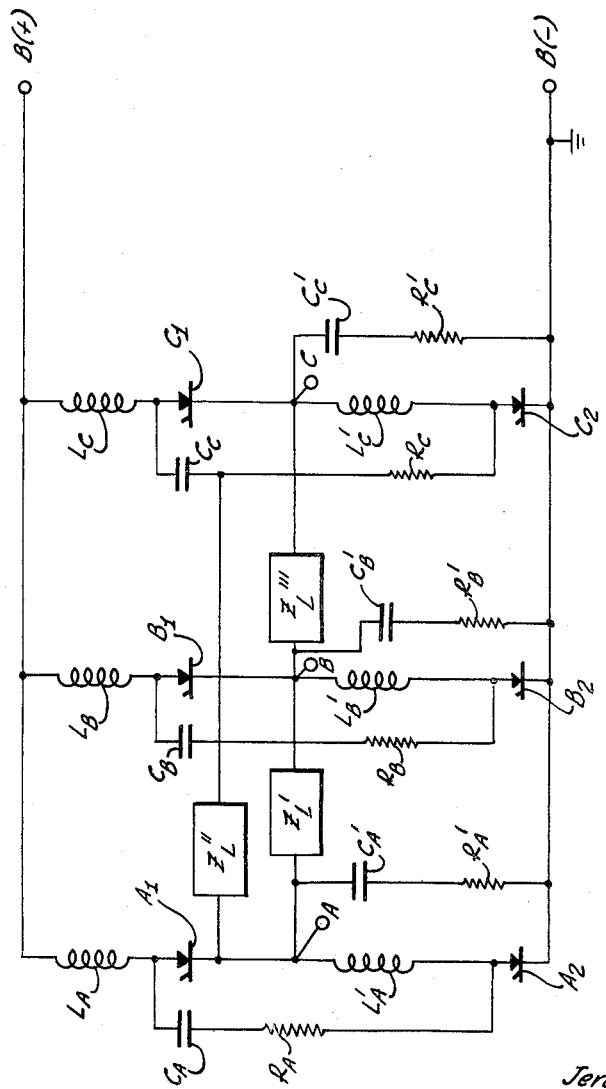

FIGURE 4 is a fragmentary schematic circuit diagram illustrating the manner in which a pair of silicon controlled rectifiers may be interconnected in the system of the invention to replace the switches schematically represented in FIGURE 1, and further illustrating circuitry for causing one of the silicon controlled rectifiers of the pair to become non-conductive whenever the other is rendered conductive, and vice versa;

FIGURE 4a is a fragmentary diagram illustrating a portion of the circuit of FIGURE 4 for descriptive purposes, and representing different voltages, currents and other parameters associated with that section;

FIGURE 4b is a fragmentary circuit representing a further section of the circuitry of FIGURE 4 for descriptive purposes, and also illustrating various constants, voltages and currents associated with that section;

FIGURE 4c is a representation of a series of curves, representing the voltages that appear across one of the silicon controlled rectifiers when the other is fired, these curves being useful in explaining how the firing of one of the rectifiers causes the other to become non-conductive;

FIGURE 5 is a diagrammatic circuit diagram of a group of three pairs of silicon controlled rectifiers which are incorporated into a switching system which is equivalent to the switching system of FIGURE 1;

FIGURE 6 is an illustration of two opposite-phased trains of triggering pulses which are introduced to the system of the embodiment of the invention to be described, and which are used to control the operation of the system;

FIGURE 7 is a table illustrating the commutation sequence of the switching system of the embodiment to be described, as represented by the individual states of conductivity and non-conductivity of the silicon controlled rectifiers in the system, as the system is triggered from one step to the next;

FIGURE 8 is a detailed circuit diagram of the switching section of a power source constructed in accordance with one embodiment of the invention, this section being illustrated as including a plurality of silicon controlled rectifiers connected as a pair of three-step ring counters and including a plurality of gates for controlling the firing of the section, the illustrated section serving to produce balanced three phase power for driving an electric motor;

FIGURE 9 is a circuit diagram of a suitable system for providing rectified alternating current exciting voltage to the system of FIGURE 8, the system of FIGURE 9 including saturable reactors to prevent current surges from being introduced into the system of FIGURE 8 with resulting possible damage to the silicon controlled rectifiers in the latter system;

FIGURE 10 is a circuit representation of a suitable system for producing the oppositely phased pair of pulse trains of FIGURE 6 for introduction to the system of FIGURE 8, the repetition frequency of the pulses in the pulse trains being precisely controlled and being controllable through a pre-established frequency range; and, FIGURE 11 is a diagrammatic circuit diagram, like FIGURE 5, of a second embodiment of the system of the invention.

The switching circuit of FIGURE 1 includes a pair of leads 10 and 12 which are connected to the positive and negative terminals respectively of a source of constant direct current. A plurality of single-pole single-throw switches A1, B1 and C1 each has its fixed contact connected to the lead 10, and a plurality of single-pole single-throw switches A2, B2, C2. Each has its armature connected to the lead 12. The armature of the switch A1 and the fixed contact of the switch A2 are connected to an output terminal A; the armature of the switch B1 and the fixed contact of the switch B2 are connected to an output terminal B; and the armature of the switch C1 and the fixed contact of the switch C2 are connected to an output terminal C. A resistor 14 is connected to the output terminal A and to the output terminal B; a resistor 16 is conneced to the output terminal B and to the output terminal C; and a resistor 18 is connected to the output terminal A and to the output terminal C.

In accordance with the concepts of the present invention, the switches A1, B1, C1 and A2, B2, C2 are controlled in such a manner that, as the system is triggered from one step to the next, the states of these switches change from one configuration to another. In the embodiment of the invention to be described, the system undergoes six different configurations, and then repeats. The configurations of the switches for the different steps are shown in the table of FIGURE 2.

It will be observed that as the system is triggered from the first step to the second step, the switch B1 closes and the switch B2 opens. Likewise, when the system is triggered from the second to the third step, the switch A2 closes and the switch A1 opens. In like manner, when the system is triggered from the third step to the fourth step, the switch C1 closes and the switch C2 opens. Similarly, when the system is triggered from the fourth step to the fifth step, the switch B2 closes and the switch B1 opens. When the system is triggered from the fifth step to the sixth step, the switch A1 closes and the switch A2 opens. Finally, when the system is returned from the sixth step to the first step, the switch C2 closes and the switch C1 opens.

The control of the switches A1, B1, C1 and A2, B2, C2 in the circuit of FIGURE 1 in accordance with the table of FIGURE 2, causes signals $I_{AB}$, $I_{BC}$ and $I_{CA}$ to be developed across the different output terminals A, B and C. These signals have the waveform illustrated in FIGURE 3, and they are displaced in phase from one another by 120 degrees, as also illustrated in FIGURE 3. The waveform of FIGURE 3 approximate sine waves, and the control of the switches in the manner described causes balanced constant-current, three phase power to be developed at the output terminals.

It will be noted from the table of FIGURE 2 that as the switching control system is triggered from one step to another, one of the switches A1, B1, C1, A2, B2, C2 is closed and a corresponding one is simultaneously opened. For example, and as mentioned above, when the system is triggered from step 1 to step 2, and as mentioned above, the switch B1 is closed and the switch B2 is opened. This switching action requires that whenever one switch of any particular pair is closed, the closure of that switch should cause the other switch of that pair to open. A circuit in which such a control is realized is shown in FIGURE 4. It will be appreciated as the present description proceeds that the switching circuit of FIGURE 4 may be incorporated into the switching system of FIGURE 1 to replace the individual pairs of switches A1 and A2, B1 and B2, C1 and C2.

In the circuit of FIGURE 4, a pair of silicon controlled rectifiers 20 and 22 form the corresponding pair of controllable switches. These rectifiers may be of the type mentioned earlier in the specification. In the circuit of FIGURE 4, an inductance coil $L_1$ is connected to the anode of the silicon controlled rectifier 20 and to the positive terminal B+ of a source of direct current. The cathode of the rectifiers 20 is connected to any appropriate load represented by the rectangle 24 and to an inductance coil $L_2$. The inductance coil $L_2$ is connected to the anode of the silicon controlled rectifier 22, the cathode of the latter rectifier being connected to the negative terminal B— of the source of direct voltage.

A capacitor $C_1$ is connected to the anode of the rectifier 20 and to the anode of the rectifier 22. A capacitor $C_2$ is connected to the cathode of the rectifier 20 and to the cathode of the rectifier 22. The voltage across the rectifier 20 is represented as $e_3$, the voltage between the anode of the rectifier 20 and the negative terminal B— is designated as $e_1$, and the voltage between the cathode of the rectifier 20 and the terminal B— is designated as $e_2$. The voltage between the positive and negative terminals of the source of direct current, is designated as V. The current flowing down through the inductance coil $L_1$ is designated as $i_1$.

Assume now that in a first condition of the network of FIGURE 4 the silicon controlled rectifier 20 is conductive and the silicon controlled rectifier 22 is non-conductive. Under these conditions, the capacitor $C_2$ is fully charged. No current flows into the capacitor $C_1$ because the non-conductivity of the rectifier 22 breaks the charging circuit. Now, when the silicon controlled rectifier 22 is fired, the resulting current flow into the capacitor $C_1$ initially drops the anode potential on the silicon controlled rectifier 20 to a value below its cathode potential, the latter potential being established by the charge in the capacitor $C_2$.

The silicon controlled rectifier 22 now is conductive and the silicon controlled rectifier 20 is rendered non-conductive. For this condition, the capacitor $C_2$ becomes discharged through the inductance coil $L_2$ and the capacitor $C_1$ becomes charged. Now when the silicon controlled rectifier 20 is again triggered to be conductive, the resulting discharge of the capacitor $C_1$ through the inductance coil $L_2$ swings the anode of the silicon controlled rectifier 22 negative with respect to its cathode, so that the silicon controlled rectifier 22 is rendered non-conductive.

Therefore, each time that one of the silicon controlled rectifiers 20, 22 is triggered to a conductive state, the other is automatically rendered non-conductive. It follows then that when the circuit of FIGURE 4 is used in the circuit of FIGURE 1 to replace individual ones of the switching pairs A1 and A2, B1 and B2, C1 and C2, the different switch configurations of the table of FIGURE 2 can be obtained by providing for the triggering of a different one of the silicon controlled rectifiers from a non-conductive to a conductive state in each successive one of the triggering steps. Circuitry for accomplishing this will be described subsequently.

The manner whereby the firing of the silicon controlled rectifier 22 causes the conductive silicon controlled rectifier 20 to become non-conductive by driving the cathode of the silicon controlled rectifier 20 positive with respect to the anode, may be demonstrated mathematically as follows. It will be understood that similar mathematics may be used to illustrate the manner whereby the firing of the silicon controlled rectifier 20 causes the previously fired silicon controlled rectifier 22 to become non-conductive.

For a more complete explanation of the following mathematical development, reference is made to the text book: "Transients in Linear Systems," Gardner and Barnes; Wiley Publishing Company, volume 1, 1942.

$$e_3 = e_1 - e_2$$

where:

$e_3$ is the voltage across the rectifier 20;
$e_1$ is the voltage between the anode of the rectifier 20 and B−;
$e_2$ is the voltage between the cathode of the rectifier 20 and B−.

It is first necessary to derive $e_2$, and this will be described with reference to the fragmentary diagram of FIGURE 4a.

In FIGURE 4a:

$$i_0 = 0$$
$$e_0 = V$$

where:

$i_0$ is the initial current;
$e_0$ is the inital voltage;
$V$ is the source between voltage $B_T$ and B−.

$$\frac{V}{S} = I\left(SL + \frac{1}{SC}\right) = I \cdot \frac{VC}{S^2LC+1} \quad (1)$$

therefore:

$$I = \frac{V}{L} \cdot \frac{1}{S^2 + \beta^2} \quad (2)$$

where:

$L = L_1 = L_2$
$C = C_1 = C_2$
$S$ is the Laplace operator
$I$ is the current in the circuit as a function of S; and $$\beta = \frac{1}{\sqrt{LC}}$$

$$E_2 = ISL \quad (3)$$
$$= V \cdot \frac{S}{S^2 + \beta^2} \quad (4)$$

where:

$E_2$ is the voltage across the circuit as a function of S.

Then by standard conversion tables, included in the text referred to above:

$$e_2 = V \cos \beta t \quad (5)$$

It is now necessary to derive $e_1$, and this will be described by reference to the fragmentary diagram of FIGURE 4b.

In FIGURE 4b:

$$i_0 = i_1$$

where: $i_1$ is the load current in the circuit.

$$\frac{V}{S} + i_0 \frac{SL}{S} = I\left(SL + \frac{1}{SC}\right) \quad (6)$$
$$= I \cdot \frac{S^2LC+1}{SC}$$
$$= IL \frac{(S^2 + \beta^2)}{S}$$

Therefore, $$I = \frac{V}{L} \cdot \frac{1}{S^2 + \beta^2} \quad (7)$$
$$+ i_0 \cdot \frac{S}{S^2 + \beta^2}$$

$$e_1 = \frac{I}{SC} = \frac{V^2}{S(S^2 + \beta^2)} + i_0 \cdot \frac{1}{S^2 + \beta^2} \quad (8)$$

where: $E_1$ is the voltage across the capacitor $C_1$ as a function of S.

Then by standard converison tables, which are included in the text referred to above:

$$e_1 = (VI - \cos \beta t) + \frac{i_0}{C\beta} \sin \beta t \quad (9)$$
$$= V(1 - \cos \beta t) + i_0 \sqrt{\frac{L}{C}} \sin \beta t \quad (10)$$

Therefore:

$$e_3 = e_1 - e_2 = V(1 - 2\cos \beta t) + i_0 \sqrt{\frac{L}{C}} \sin \beta t$$

In FIGURE 4c the waveform I represents the $$V(1 - 2 \cos \beta t)$$

term and the waveform II represents the $$i_0 \sqrt{\frac{L}{C}} \sin \beta t$$

term. The waveform III represents the voltage $e_3$ across the silicon controlled rectifier 20, and this voltage corresponds to the sum of the waveforms I and II. It will be seen that the voltage $e_3$ is initially negative and then rises up to and crosses the zero reference axis. Therefore, the instant that the silicon controlled rectifier 22 is fired, a negative voltage is produced across the silicon controlled rectifier 20 to render the latter rectifier non-conductive. In like manner, and as noted above, the instant that the silicon controlled rectifier 20 is fired, a negative voltage is created across the silicon controlled rectifier 22 to extinguish the latter rectifier. In each instance, the subsequent positive swing of the voltage across the rectifier is insufficient to return it to a conductive state, until a trigger pulse is again applied to its control electrode. As is hereinafter described, the positive swing is limited by clamping or damping components.

The circuit of FIGURE 5 is similar to the switching circuit of FIGURE 1, except that each of the pairs of switches in the circuit of FIGURE 1 has been replaced by a switching circuit of the type described in conjunction with FIGURE 4 and which includes a pair of silicon controlled rectifiers. The circuit of FIGURE 5 includes a group of inductance coils $L_A$, $L_B$ and $L_C$ which are all connected to the positive terminal B+ of a source of direct current. The circuit also includes a group of silicon controlled rectifiers $A_1$, $B_1$ and $C_1$ whose anodes are connected to respective ones of the inductance coils.

The circuit of FIGURE 5 includes a second group of inductance coils $L_A'$, $L_B'$ and $L_C'$. These latter coils are connected to the anodes of respective ones of a group of silicon controlled rectifiers $A_2$, $B_2$ and $C_2$. The cathodes of this latter group of rectifiers are all connected to the negative terminal B− of the direct current source, and this latter terminal may be connected to a point of reference potential such as ground. The inductance coils $L_A'$, $L_B'$ and $L_C'$ are also connected to the cathodes of respective ones of the rectifiers $A_1$, $B_1$ and $C_1$, and these inductance coils are also connected to respective output terminals A, B and C.

A capacitor $C_A$ is connected to the anode of the rectifier $A_1$ and to the anode of the rectiger $A_2$, a capacitor $C_B$ is connected to the anode of the rectifier $B_1$ and to the anode of the rectifier $B_2$, and the capacitor $C_C$ is connected to the anode of the rectifier $C_1$ and to the anode of the rectifier $C_2$. A group of grounded capacitors $C_A'$, $C_B'$ and $C_C'$ are connected to the cathodes of respective ones of the rectifiers $A_1$, $B_1$ and $C_1$. A load impedance $Z_L'$ is connected between the output terminals A and B, a load impedance $Z_L''$ is connected between the output terminals A and C, and a load impedance $Z_L'''$ is connected between the output terminals B and C.

In the manner described in conjunction with FIGURE 4, when the silicon controlled rectifier $A_1$ is non-conductive, the silicon controlled rectifier $A_2$ is conductive, and vice versa; and when the silicon controlled rectifier $A_2$ is non-conductive, the rectifier $A_1$ is conductive, and vice versa. This also applies to the silicon controlled rectifiers of the pairs $B_1$ and $B_2$, $C_1$ and $C_2$. Then, when the non-conductive rectifier of any pair is fired, the other conducting rectifier of that pair is rendered non-conductive.

The firing of the silicon controlled rectifiers is carried out by means of a first and second train of triggering pulses. The first train of triggering pulses is introduced to the silicon controlled rectifiers $A_1$, $B_1$ and $C_1$ through appropriate gates, as will be described; and this train is shown by the pulses of the upper curve (phase "A") in FIGURE 6. The second train of triggering pulses is introduced through appropriate gates to the silicon controlled rectifiers $A_2$, $B_2$ and $C_2$; and this latter train is displaced 180 degrees from the first train, as shown by the lower curve (phase "B") in FIGURE 6.

The system of FIGURE 5 is a type of double ring counter, as noted above; and the silicon controlled rectifiers are capable of assuming the six different configurations, illustrated by the table of FIGURE 2, as the system is triggered through six different steps by the two trains of triggering pulses of FIGURE 6. These steps are also more completely illustrated by the table of FIGURE 7.

During the first step, and as shown by the table of FIGURE 7, the silicon controlled rectifiers $A_1$, $B_2$ and $C_2$ are conductive and the silicon controlled rectifiers $A_2$, $B_1$ and $C_1$ are non-conductive. During this step the output terminal A is established at a positive voltage with respect to ground designated as a state "1" in FIGURE 7, and the terminals B and C are both established at reference voltage, designated in each instance as a state "0." In like manner, and as shown by the table of FIGURE 7, the output terminals are established at states of either "0" or "1" voltage levels in the particular illustrated sequence as the system is triggered from one step to another. These voltages states are used, as will be described, to provide reference levels for appropriate gates to cause the appropriate rectifiers to be fired for each step.

For example, the gate to the control electrode of the silicon controlled rectifier $B_1$ is referenced to the output terminal C to be conductive when the terminal is at "0" state. In like manner, the gate to the control electrode of the silicon controlled rectifier $C_1$ is referenced to the output terminal A to be conductive when that terminal is at "0" state; and the gate to the control electrode of the silicon controlled rectifier $A_1$ is referenced to the output terminal B to be conductive when that terminal is at "0" state.

Similarly, the gate to the control electrode of the silicon controlled rectifier $A_2$ is referenced to the output terminal B to be conductive when that terminal is at the voltage state "1"; the gate to the control electrode of the silicon controlled rectifier $B_2$ is referenced to the output terminal C to be conductive when that terminal is at "1" state; and the gate to the control electrode of the silicon controlled rectifier $C_2$ is referenced to the output terminal A to be conductive when that terminal is at the "1" voltage state.

Now, as the trigger pulses of FIGURE 6 are introduced to the system of FIGURE 5, the system is first triggered by a phase "A" pulse from its first to its second step by the firing of the silicon controlled rectifier $B_1$, this causing the rectifier $B_2$ to become non-conductive in the described manner. The gate to the rectifier $B_1$ is conductive to the phase "A" pulse at this time because the output terminal C is at the "0" voltage state during the first step of the system. The next triggering pulse (which is a phase "B" pulse) causes the system of FIGURE 5 to move from its second to its third step by firing the silicon controlled rectifier $A_2$ which, in the described manner, causes the silicon controlled rectifier $A_1$ to become non-conductive. The gate to the silicon controlled rectifier $A_2$ is conductive to the phase "B" pulse because the output terminal B, to which that gate is referenced, is at the "1" voltage state for step two.

The next phase "A" triggering pulse causes the system of FIGURE 5 to move from its third to its fourth step by firing the silicon controlled rectifier $C_1$. This, in the described manner, causes the silicon controlled rectifier $C_2$ to become non-conductive. The gate to the silicon controlled rectifier $C_1$ is conductive to that triggering pulse because the output terminal A to which that gate is referenced is at the "0" voltage state during the third step.

The following phase "B" triggering pulse causes the system of FIGURE 5 to move from its fourth to its fifth step by firing the silicon controlled rectifier $B_2$ which, in the described manner, causes the silicon controlled rectifier $B_1$ to become non-conductive. The gate to the silicon controlled rectifier $B_2$ is conductive to that triggering pulse because the output terminal C to which that gate is referenced is at the "1" voltage state for step 4 of the circuit.

The next phase "A" triggering pulse causes the system of FIGURE 5 to move from its fifth step to its sixth step by firing the silicon controlled rectifier $A_1$ which, in the described manner, causes the silicon controlled rectifier $A_2$ to become non-conductive. The gate to the silicon controlled rectifier $A_1$ is conductive to that triggering pulse because the output terminal B to which that gate is referenced is at the "0" voltage state during the fifth step.

Finally, the next phase "B" triggering pulse causes the system of FIGURE 5 to move from its sixth configuration back to its first configuration by firing the rectifier $C_2$. This, in the described manner, causes the rectifier $C_1$ to become non-conductive. The gate to the silicon controlled rectifier $C_2$ is conductive to that triggering pulse because the output terminal B to which that gate is referenced is at the "1" voltage state at step 5.

The circuit diagram of FIGURE 8 illustrates a three-phase system, which is similar to the system of FIGURE 5, and in which appropriate gates have been incorporated for carrying out the functions described in the preceding paragraphs. Moreover means are included in FIGURE 8 for clamping the potential across any one of the silicon rectifiers after it becomes non-conductive to prevent it from firing as the circuit oscillates. In the circuit diagram of FIGURE 8, the three-phase motor M1 is connected between the output terminals A, B and C. This motor, for example, may be a three-phase, 136 volt, 80 c.p.s., Y-connected induction motor. The circuit diagram of FIGURE 8 is capable of driving this motor at precisely controlled variable speeds by providing a variably frequency three phase constant current to the motor.

A rectified voltage from a current source, which will be described in some detail in conjunction with FIGURE 9, is introduced across the terminals 100 in FIGURE 8. One of these terminals is connected, for example, to a lead 102, and the other is connected to a lead 104.

The phase "A" trigger pulses, shown in the upper curve of FIGURE 6, are introduced to an input terminal 106; and the phase "B" trigger pulses, shown in the lower curve of FIGURE 6, are introduced to an input terminal 108. The input terminal 106 connects with a lead 110, and the input terminal 108 connects with a lead 112.

The circuit of FIGURE 8 includes a plurality of silicon controlled rectifiers of the type described above, and these rectifiers are designated at Q9–Q14. A first group of inductance coils $L_1$, $L_2$ and $L_3$ are connected to the lead 102 and to the anodes of respective ones of the rectifiers Q9, Q10 and Q11. Each of these inductance coils may have an inductance of, for example, 800 microhenries. A second plurality of inductance coils $L_4$, $L_5$ and $L_6$ are connected to the cathodes of respective ones of the rectifiers Q9, Q10 and Q11 and to the anodes of respective ones of the rectifiers Q12, Q13 and Q14. The cathodes of the latter group of rectifiers are all connected to the lead 104.

A first lead 114 is connected to the output terminal C and to the cathode of the rectifier Q11. A second lead 116 is connected to the output terminal B and to the cathode of the rectifier Q10. A third lead 118 is connected to the output terminal A and to the cathode of the rectifier Q9.

A group of diodes D13, D14 and D15 all have their cathodes connected to the positive terminal of a 10 volt direct voltage source. Each of these diodes may be of the type designated 1N92. The respective anode of the diodes D13, D14 and D15 are connected to the base electrodes of respective transistors Q1, Q2 and Q3. These transistors may be of the PNP type, as are presently designated 2N224. The emitters of the transistors Q1, Q2 and Q3 are all connected to the lead 110 and to respective resistors R31, R32 and R33. Each of these resistors may have a resistance of 560 ohms. The base electrodes of the transistors Q1, Q2 and Q3 are connected to respective resistors R34, R35 and R36. Each of these latter resistors may have a resistance of 5 kilo-ohms. The collector electrodes of the transistors are connected to respective resistors R28, R29 and R30. Each of these latter resistors has a resistance of 10 kilo-ohms. The resistors R28 and R31, R29 and R32, R30 and R33 are all connected to the lead 104. The resistor R34 is connected to the lead 114, the resistor R35 is connected to the lead 116, and the resistor R36 is connected to the lead 118.

The collector of the transistor Q3 is connected to the anode of a dide D21, the cathode of which is connected to the firing electrode of the silicon controlled rectifier Q11. This firing electrode is also connected to the cathode of a diode D18, the anode of which is connected to the cathode of the rectifier. The diodes D18 and D21 may be of the type presently designated 1N92. The diode D18 serves to protect the rectifier Q11 from excess inverse voltages, and the diode D21 serves as a protection for the transistor Q3. In like manner, the collector of the transistor Q2 is connected to the anode of a dide D22, the cathode of which is connected to the firing electrode of the silicon controlled rectifier Q10. A diode D17 is connected to the firing electrode of that rectifier and to its cathode. Likewise, the collector of the transistor Q11 is connected to the anode of a diode D23. The cathode of the latter diode is connected to the firing electrode of a rectifier Q11, and to the cathode of a diode D16. The anode of the diode D16 is connected to the cathode of the rectifier Q11. A pair of shunt capacitors C13 and C14, each having a capacitance of 15 microfarads are connected to the anode of the rectifier Q9 and to the anode of the rectifier Q12. A pair of shunt connected capacitors C16 and C15, each having a capacity of 15 microfarads are connected to the anode of the rectifier Q10 and to the anode of the rectifier Q13. Finally, a pair of shunt connected capacitors C17 and C18 are connected to the anode of the rectifier Q11 and to the anode of the rectifier Q14. Each of these latter capacitors, likewise, has a capacity of 15 microfarads.

The lead 112 is connected to the anodes of a group of diodes D22, D23 and D24 through respective isolating resistors 113, 115 and 117. These resistors may each have a value of 70 ohms. The resistors 113, 115 and 117 are also connected respectively to the cathodes of a group of Zener diodes Z1, Z2 and Z3. The diodes D22, D23 and D24 may be of the type designated 1N92. The cathode of the diode D24 is connected to the lead 118, the cathode of the diode D23 is connected to the lead 116, and the cathode of the diode D22 is connected to the lead 114. The Zener diodes Z1, Z2 and Z3 have their anodes connected to the firing electrodes of respective ones of the silicon controlled rectifiers Q12, Q13 and Q14. These Zener diodes serve to block signals from corresponding ones of the silicon controlled rectifiers, until such signals exceed a selected threshold of, for example, 2 volts. This obviates any tendency for the voltage drops across the diodes D22, D23 or D24, when the diodes are conductive, to trigger the silicon controlled rectifiers Q12, Q13 and Q14.

A pair of shunt connected capacitors C19 and C20 are connected between the leads 118 and 104. Each of these capacitors may have a capacity of 15 microfarads. A similar pair of shunt connected capacitors C21 and C22 are connected between the leads 114 and 104. Each of these latter capacitors may have a capacity of 15 microfarads. Finally, a pair of shunt connected capacitors C23 and C24 are connected to the lead 116 and to the lead 104. Each of these latter capacitors may have a capacity of 15 microfarads. A group of inductance coils $L_4$, $L_5$ and $L_6$ are connected to the anodes of respective one of the rectifiers Q12, Q13 and Q14, and to the leads 118, 116 and 114 respectively. Each of these inductance coils may have an inductance, for example, of 800 microhenries. It will be noted that the inductance coils $L_1$–$L_6$ used in the circuit of FIGURE 8 may have a low inductance (of the order of 800 mircohenries, for example as indicated above).

A resistor R40 is connected to the lead 102 and to the output terminal C, a resistor R41 is connected to the lead 104 and to the output terminal B, and a resistor R42 is connected to the lead 104 and to the output terminal A. Each of these resistors may have a resistance of 10 kilo-ohms.

A diode D33 is connected across the capacitors C17 and C18, the anode of this diode being connected to the inductance coil $L_6$ and the cathode being connected to the inductance coil $L_3$. A diode D32 is connected across the capacitors C15 and C16, the anode of this latter diode being connected to the inductance coil $L_5$ and its cathode being connected to the inductance coil $L_2$. A diode D31 is connected across the capacitors C14 and C13, the anode of the diode D31 being connected to the inductance coil $L_4$ and its cathode being connected to the inductance coil $L_1$. Each of these diodes may be of the type designated 3052.

A second group of diodes D34, D36 and D35 are connected across respective ones of the pairs of capacitors C19 and C20, C21 and C22, and C23 and C24. The anodes of these latter diodes are all connected to the lead 104, and the cathodes are respectively connected to the output terminals A, C and B. The latter diodes may also be of the type designated 3052.

The diodes D31–D36 perform a quenching function when their corresponding silicon controlled rectifiers are first selectively rendered conductive. For example, when the silicon controlled rectifier Q11 is first rendered conductive, the tuned circuit formed by the inductance coil $L_6$ and the capacitors C17, C18 tends to become oscillatory, and the second half-cycle of the oscillating current, if it were not for the diode D33, would flow back into the silicon controlled rectifier Q11 and tend to oppose the current flow in the rectifier and return it to its non-conductive state. However, this opposing current flows through the diode D33 and is quenched by the diode. The other diodes of the two groups function in the same manner to quench the commutating current to their respectively associated silicon controlled rectifiers to obviate any tendency for the rectifiers to return to a non-conductive state after they have been triggered to a conductive state.

An examination of the circuit of FIGURE 8 will reveal that the connections to the pairs of silicon controlled rectifiers is similar to those discussed in FIGURE 5. In the diagram of FIGURE 8, the rectifiers Q9 and Q12 make up the pair which comprise a "phase A" network. Likewise, the rectifiers Q10 and Q12 form the pair which make up a "phase B" network, and the pair Q11 and Q14 make up a "phase C" network.

As any non-conductive silicon controlled rectifier in a particular pair is triggered, the other conductive rectifier of that pair is immediately rendered non-conductive, in the described manner. The necessary triggering gates for the rectifiers Q9, Q10 and Q11 are made up by the circuits of the transistors Q1, Q2 and Q3. The resistor R34 which is connected to the output terminal C, conditions the transistor Q1 for conduction, only when that output terminal is established at the "0" voltage state. Likewise, the resistor R35 which connects the base of the transistor Q2 to the output terminal B conditions the latter transistor for conduction only when the terminal B is at the "0" voltage state. Finally, the resistor R36 which connects the base of the transistor Q3 to the output terminal A, causes the latter transistor to be conditioned for conduction only when the output terminal A is at the "0" voltage state. The "phase A" triggering pulses from the circuit of FIGURE 10 (to be described) and which are introduced to the lead 110, are passed by the transistors Q1, Q2 and Q3 to the firing electrodes of the rectifiers Q9, Q10 and Q11 in the sequence set forth in the table of FIGURE 7.

Likewise, the diode D24 is conditioned for conduction only when the output terminal A is at the "0" state. Therefore, when the terminal A is at the "1" voltage state, the diode D24 is not conductive to the introduction of a positive triggering pulse to the input terminal 108, so that such triggering pulse breaks down the Zener diode Z3 to fire the silicon controlled rectifier Q14. Likewise, a similar trigger pulse will fire the silicon controlled rectifier Q13, when the diode D23 is rendered non-conductive by the output terminal C being at its "1" voltage state. In like manner, a triggering pulse on the lead 112 will fire the silicon controlled rectifier Q12, when the diode D22 is rendered non-conductive by the output terminal B being at its "1" voltage state.

As noted above, the triggering pulses of the "phase A" train (FIGURE 6) are displaced 180 degrees from the triggering pulses of the "phase B" train (FIGURE 6). In this manner, the triggering pulses of the two trains function in alternation to trigger the system of FIGURE 8 through the steps set out in the table of FIGURE 7. This triggering of the circuit of FIGURE 8 causes the waveforms of FIGURE 3 to be developed across the output terminals A, B and C, and the resulting three-phase power serves to drive the motor M1.

The circuit of FIGURE 8 serves to drive the motor M1 at a fixed and precise speed, so long as the repetition frequency of the phase "A" and phase "B" trains of triggering pulses introduced to the input terminals 106 and 108 remains constant. It follows that the speed of the motor can be changed, merely by changing the frequency of these pulses. The circuit of FIGURE 10, which will be described subsequently, represents appropriate oscillator source for the triggering pulses. That source, as will be described, includes a stable oscillator having a controllable frequency. The controllable oscillator source provides for the accurate speed drive of the motor M1, together with an appropriate speed control for the motor.

As described above, a rectified voltage is introduced across the input terminals 100 of FIGURE 8. This voltage may be provided by the rectifying circuit of FIGURE 9. The circuit of FIGURE 9 includes a group of three input terminals 200 which are connected, for example, to a 240 volt, 60 cycle, three-phase alternating current source. The terminals 200 are respectively connected through the secondary windings of a group of three saturable reactors 202, 204 and 206 to the cathodes of respective ones of a plurality of diodes 208, 210 and 212, and also through these windings to the anodes of a plurality of diodes 214, 216 and 218. The anodes of the diodes 208, 210 and 212 are connected to one pair of output terminals 220, and the cathodes of the diodes 214, 216 and 218 are connected to the other output terminal 220. A rectified constant current voltage appears across the output terminal 220, and this rectified voltage is applied to the input terminals 100 of the circuit of FIGURE 8.

The primary windings of the saturable reactors 202, 204 and 206 are connected in series, and these series connected windings are connected to the cathodes of a pair of diodes 222 and 224 and to the anodes of a pair of diodes 226 and 228. The anode of the diode 222 and the cathode of the diode 226 are connected to one side of a variable transformer 230. The anode of the diode 224 and the cathode of the diode 228 are connected to a variable arm associated with the transformer 230. The primary of the transformer 230 is connected across the terminals of a 120 volt alternating current source.

The arm or armature of the variable transformer 230 may be adjusted to control the amount of current flowing through the series connected primaries of the saturable reactors 202, 204 and 206. These reactors are adjusted to a point that they provide the circuit of FIGURE 9 with the characteristics of an essentially constant current source.

As noted above, the triggering pulses introduced to the terminals 106 and 108 of the circuit of FIGURE 8 may be produced by the circuit of FIGURE 10. The circuit of FIGURE 10 includes a stable oscillator circuit which includes a uni-junction transistor Q5. This transistor may be of the type designated 2N491. The first base electrode of the transistor Q5 is connected to a resistor R11 and to a capacitor C7. The resistor R11 may have a resistance of 560 ohms and it is connected to the positive terminal of a 10 volt direct voltage source. The capacitor C7 may have a capacity of .01 microfarad and it is connected to the input terminal 250 of a high power flip-flop 252.

The emitter electrode of the transistor Q5 is connected to a capacitor C6 and to a resistor R10. The capacitor C6 may have a capacity of .1 microfarad, and it is connected to a point of reference potential, such as ground, as is the second base electrode of the transistor Q5.

The resistor R10 may have a resistance of 1 megohm and it is connected to the armature of a potentiometer R7. The potentiometer R7 has a resistance of 20 kiloohms, and it is connected to the positive terminal of a 240 volt direct voltage source and to a resistor R8. The resistor R8 has a resistance of 560 ohms and it is connected to a potentiometer R9. The other terminal of the potentiometer R9 and the armature of that potentiometer are both connected to ground. The potentiometer has a resistance, for example, of 1 kilo-ohm.

The transistor Q5 is connected as a uni-junction transistor oscillator. This is an extremely stable oscillator, and its frequency is controllable by controlling the potentiometer R7. The parameters of the circuit are such, that the voltage control by the potentiometer R7 is over a low resistance range for linear frequency change. The uni-junction transistor oscillator introduces a sine wave to the input terminal 250 of the flip-flop 252. This sine wave causes the flip-flop to be triggered back and forth at a repetition frequency corresponding to the frequency of the oscillator. The flip-flop produces a first set of output pulses at an output terminal 254, these being used to form the pulse train of "phase A." The flip-flop includes a second output terminal 256 at which output pulses, in phase opposition to the output pulses in the output terminal 254, are produced. The output pulses at the output terminal 256 are used to form the pulses of the "phase B" pulse train.

The flip-flop 252 includes a PNP transistor Q6 and a PNP transistor Q6A. These transistors may be of the type designated 2N224.

The emitter of the transistor Q6 is connected to a grounded resistor R16 which may have a resistance of 22 kilo-ohms. The emitter of the transistor Q6A on the other hand, is grounded. A diode D12, which may be of the type designated 1N99, has its cathode connected to the emitter of the transistor Q6, and has its anode connected to the base of the transistor Q6A. The collector of the transistor Q6 is connected to a resistor R12, and the collector of the transistor Q6A is connected to a resistor R13. Each of these resistors may have a resistance of 1 kilo-ohm, and both may be connected to the negative terminal of a 20 volt direct voltage source.

A resistor R14 of, for example, 27 kilo-ohms, shunted by a capacitor C8, of, for example, 220 micro-microfarads, are connected to the collector of the transistor Q6 and to the base of the transistor Q6A. A similar resistor R15, and a similar shunting capacitor C9 are connected to the collector of the transistor Q6A and to the base of the transistor Q6.

The flip-flop 252 responds to the input signal applied to the terminal 250 to produce the output pulses. As noted above, two trains of output pulses are produced by the flip-flop, these trains appearing at the output terminals 254 and 256, and being displaced 180 degrees with respect to one another.

The output pulses from the terminal 254 are introduced to a differentiating circuit which includes a capacitor C12 and a resistor R20. The capacitor C12 may have a capacity of .01 microfarad, and the resistor R20 may have a resistance of 15 kilo-ohms. The capacitor C12 and the resistor are connected in series and to the base of a transistor Q8. This transistor may be of the type designated 2N224. The emitter of the transistor Q8 is connected to the positive terminal of a 10 volt direct voltage source. A resistor R22 of, for example, 1 kilo-ohm, is connected to the emitter of the transistor Q8 and to its base.

The collector of the transistor 28 is connected to a grounded resistor R24. This resistor may have a resistance of 10 kilo-ohms. The collector is also connected to an output terminal 260. The pulse train of "phase A," illustrated in FIGURE 6, is produced at the output terminal 260 for introduction to the input terminal 106 of FIGURE 6.

In like manner, the output terminal 256 is connected to a similar differentiating network made up of the capacitor C12 and series resistor R19. The resistor R19 is connected to the base of a transistor Q7 which may be similar to the transistor Q8. The emitter of the transistor Q7 is also connected to the positive terminal of the 10 volt direct voltage source, and to a resistor R21. The resistor R21 is also connected to the base of the transistor Q7. The collector of the transistor Q7 is connected to a 10 kilo-ohm grounded resistor R23, and to an output terminal 262. The triggering pulses of "phase B" (FIGURE 6) are produced at the output terminal 262 for introduction to the input terminal 108 of FIGURE 8.

The invention provides, therefore, an improved polyphase power source for driving an appropriate load, such as an electric motor. The power source of the present invention includes, for example, solid-state devices such as silicon controlled rectifiers, and it is capable of being controlled and of functioning in the described manner so that the motor may be driven at precisely controlled variable speeds.

The frequency of the polyphase output power derived from the power source of the invention may be controlled through a wide range, merely by controlling the frequency of the triggering pulses generated by the oscillator circuit of FIGURE 10 through a correspondingly wide frequency range. As noted previously, a constructed embodiment of the invention served to control the speed of a polyphase electric motor through a range of from 3 c.p.s. to 80 c.p.s. However, the speed range can be increased, for example, to corresponding to frequencies of the order of 10 kilocycles.

The speed of the motor is controlled by controlling the adjustment of the potentiometer R7 in the specific embodiment of the invention described in conjunction with FIGURE 10. This type of speed control permits the convenient modification of the system incorporate precise servo or crystal controls, or convenient remote controls, for controlling the speed of the motor.

The power losses in the polyphase power source of the present invention are extremely low. As noted previously, the constructed embodiment of the invention exhibited efficiencies of the order of 95%. Moreover, the high power handling capabilities of the silicon controlled rectifiers, enables power sources to be constructed in accordance with the invention to handle extremely high loads up to the order, for example, of 4½ kilo-volt amperes.

The circuit of FIGURE 11 is similar in some respects to the schematic diagram of FIGURE 5, and like elements have been designated by the same letters. It will be remembered in the discussion of FIGURE 8, that the quenching diodes D31–D36 were included in the circuit to damp out oscillatory currents. These oscillatory currents were produced in the associated tuned circuits when the silicon controlled rectifiers were selectively rendered conductive. In the circuit of FIGURE 11, a resistor $R_A$ is included in series with the capacitor $C_C$. In like manner, the resistor $R_A'$, is connected in series with the capacitor $C_A'$, the resistor $R_B'$ is connected in series with the capacitor $C_B'$, and a resistor $R_C'$ is included in series with the capacitor $C_C'$. The values of the different resistors are chosen to provide critical damping in the corresponding tuned circuits. The use of these resistors obviates the need for the quenching diodes used in the embodiment of FIGURE 8. This is because there is no tendency for oscillatory back currents to flow and oppose the selective conduction of the silicon controlled rectifiers.

The circuit of FIGURE 11 has been found to be somewhat more efficient than the circuit of FIGURE 8. It is believed unnecessary to show a complete system embodying the concept of FIGURE 11. Such a system may be similar to the system of FIGURES 8, 9 and 10, but with the quenching diodes replaced by the series resistors in the manner explained in FIGURE 11.

The present invention provides, therefore, an improved solid-state polyphase power source of relatively high power. The power source of the invention may be constructed to be relatively low in cost, yet it is capable of providing a most accurate and precise variable speed power control for an induction motor, or other electrical device, through an extremely wide range of speeds.

I claim:

1. A multi-phase power supply including, three pairs of solid state switching means, each of the switching means having a conductive and a non-conductive state, a source of constant current connected to each of said pairs of switching means, two critically damped tuned circuits interconnected with the switching means of each of the three pairs to cause one of the switching means in each pair to become nonconductive when the other switching means becomes conductive, circuit means interconnecting said three pairs of switching means in a three stage double ring counter arrangement, and pulsing circuit means for operating said three pairs of switching means as a double ring counter arrangement to provide a three phase constant current output.

2. A multi-phase power supply system including: a first plurality and a second plurality of electronic discharge means each having a conductive state and a non-conductive state, means for connecting the discharge means of the first plurality to a first potential point and for connecting the discharge means of the second plurality to a second potential point, means for establishing a potential difference between said first and second potential points, a plurality of electrically conductive means respectively connected to individual ones of the discharge means of the first plurality and to corresponding ones of the discharge means of the second plurality to form a plurality of interconnected pairs of the discharge means, means for connecting a plurality of load impedance elements between respective ones of the pairs of discharge means interconnected by individual ones of said conductive means, a first plurality of gate networks connected to different ones of said conductive means and to different ones of said electronic discharge means of said first plurality and a second plurality of gate networks connected to different ones of said conductive means and to different ones of said electronic discharge means of said second plurality, said gate networks establishing actuating paths to said discharge means of the first and second pluralities in a particular sequence as determined by the potential states of respective ones of the conductive means, first means coupled to the gate networks of the first plurality for introducing a first train of trigger pulses thereto to render preselected discharge means in the first plurality conductive in said particular sequence, and second means coupled to the gate networks of the second plurality for introducing a second train of trigger pulses thereto phase displaced from the first train to render the preselected discharge means of the second plurality conductive in said particular sequence at different times for creating individual current flows in the load impedance elements of variable magnitude and sense and having a particular phase relationship.

3. The power supply defined in claim 2 and which includes a plurality of control circuits respectively coupled to said discharge means of said first plurality and to said corresponding ones of said discharge means of said second plurality to cause one of the discharge means of each pair interconnected by a corresponding one of said conductive means to be rendered non-conductive when the other discharge means of that pair is rendered conductive.

4. The power supply system defined in claim 2 in which said electronic discharge means each comprise a silicon controlled rectifier including a control electrode for rendering the same conductive, and in which the gate network connected to the particular rectifier is connected to the control electrode included therein.

5. The combination defined in claim 2 and which includes a source of trigger pulses coupled to said first and second introducing means, and a frequency control member included in the source for controlling the repetition frequency of the pulses of said first and second trains.

6. A multi-phase power supply including, three pairs of solid state switching means, each of the switching means having a conductive and a non-conductive state, a source of constant current connected to each of said pairs of switching means, two critically damped tuned circuits interconnected to the switching means of each of the three pairs to cause one of the switching means in each pair to become non-conductive when the other switching means becomes conductive, circuit means interconnecting said three pairs of switching means in a three stage double ring counter arrangement, and an adjustable repetition rate pulsing source for operating said three pairs of switching means as a double ring counter arrangement to provide a three phase constant current output having a frequency determined by the repetition rate of the pulsing source.

7. A power supply for converting direct current power into three phase alternating power, said supply comprising the combination of:
input means having two sides of opposite polarity for being connected to a source of said direct current power,
three pairs of solid state switching means with the switching means in each pair being connected in series with each other and extending between the opposite sides of said input means, each of said switching means having a conductive and a non-conductive state,
a three phase output means connected to each of said pairs at the junction between the switching means in the pair,
tuned circuits interconnected to the switching means of each of the three pairs to cause one of the switching means in each pair to become non-conductive when the other switching means in that pair becomes conductive,
control circuit means interconnected with said three pairs of switching means to form a three-stage, double-ring counter arrangement for controlling the switching of said solid state switching means between their conductive and non-conductive states, and
a source of trigger pulses operatively interconnected with said control circuit means for triggering said control circuit means and operating said three pairs of switching means as a double-ring counter arrangement to provide three phase currents on said output means having frequencies determined by the repetition rate of the pulsing source.

8. A power supply for converting direct current power into three phase alternating power, said supply comprising the combination of:
input means having two sides of opposite polarity for being connected to the sides of opposite polarity on a source of said direct current power,
three pairs of solid state switching means with the switching means in each pair being connected in series with each other and extending between the opposite sides of said input means, each of said switching means having a conductive and non-conductive state and a control element for switching said switching means from said non-conductive state of said conductive state,
three phase output means connected to each of said pairs of switching means at the junction between the switching means in the pair,
circuit means interconnected with each of the said control elements for applying individual trigger pulses to said control elements for causing the switch means to become conductive,
means for each of said pairs interconnected with the switching means in the pair and responsive to the voltage drops thereacross, said last means being effective to cause each of the switching means to become non-conductive when the other switch means in that pair becomes conductive and the voltage drop thereacross decreases below a predetermined level, and
a source of trigger pulses operatively interconnected with said circuit means for supplying triggering pulses to said control elements for triggering said control elements on in a predetermined sequence to provide three phase currents on said output means having frequencies determined by the repetition rate of the pulsing source.

9. A power supply for converting direct current power into three phase alternating power, said supply comprising the combination of:
input means having two sides of opposite polarity for being connected to the side of opposite polarity on a source of said direct current power,
three pairs of solid state switching means with the switching means in each pair being connected in series with each other and extending between the opposite sides of said input means, each of said switching means having a conductive and non-conductive state,
a control element on each of said switching means for switching said switching means from said non-conductive state to said conductive state in response to a trigger pulse thereon,
three phase output means connected to each of said pairs of switching means at the junction between the switching means in the pair, a control circuit interconnected with each of said control elements for applying individual trigger pulses to said control elements for causing said switch means to become conductive, circuits for each of said pairs interconnected with the switching means in the pair and responsive to the voltage drops across the switching means, said circuits being effective to apply a signal to each of the switching means when the voltage drop across the other switch means in that pair decrease as a result of the other switching means becoming conductive, said signal being effective to cause the switching means to become non-conductive, and a variable frequency source of trigger pulses operatively interconnected with said control circuit for supplying triggering pulses to said control elements for switching said control elements on in a predetermined sequence, each of said three phase currents of said output means having a frequency that is a function of the repetition rate of the pulsing source.

References Cited by the Examiner
UNITED STATES PATENTS

| | | | |
|---|---|---|---|
| Re. 20,391 | 6/37 | Sabbah | 321—36 X |
| 2,179,366 | 11/39 | Willis | 321—36 |
| 2,338,118 | 1/44 | Klemperer | 321—35 |
| 2,784,365 | 3/57 | Fenemore et al. | 321—36 X |
| 2,912,634 | 11/59 | Peoples | 321—35 X |
| 2,953,735 | 9/60 | Schmidt | 321—27 X |
| 3,109,976 | 11/63 | Sichling | 321—45 |

OTHER REFERENCES

Notes on the application of the silicon controlled rectifier, General Electric Bulletin ECG-371-1, December 1958, pages 36-37, and 52-53 relied on 323—22 CR.

LLOYD McCOLLUM, *Primary Examiner.*

SAMUEL BERNSTEIN, *Examiner.*